United States Patent [19]
Rajala

[11] 3,762,030
[45] Oct. 2, 1973

[54] METHOD FOR MAKING A FRICTION WELDED ARTICLE
[75] Inventor: Ronald G. Rajala, Loveland, Ohio
[73] Assignee: General Electric Company, Cincinnati, Ohio
[22] Filed: Dec. 21, 1971
[21] Appl. No.: 210,386

[52] U.S. Cl. .................. 29/470.3, 29/557, 228/2
[51] Int. Cl. ............................................. B23k 27/00
[58] Field of Search .................... 228/2; 29/470.3, 29/557; 156/73

[56] References Cited
UNITED STATES PATENTS

| | | | |
|---|---|---|---|
| 3,175,284 | 3/1965 | Cotovsky | 29/470.3 |
| 3,235,312 | 2/1966 | Hollander | 29/470.3 X |
| 3,421,201 | 1/1969 | Oberle et al. | 29/470.3 |
| 3,504,425 | 4/1970 | Sutovsky et al. | 29/470.3 |
| 3,631,585 | 1/1972 | Stanam | 29/470.3 |

FOREIGN PATENTS OR APPLICATIONS
572,789   10/1945   Great Britain ................... 29/470.3

Primary Examiner—J. Spencer Overholser
Assistant Examiner—Robert J. Craig
Attorney—Derek P. Lawrence et al.

[57] ABSTRACT

First and second metal components to be joined at opposed interface surfaces by friction welding, the first component having greater hot strength than the second component, are friction welded by first shaping the interface surface of the first higher hot strength component prior to friction welding so that initial contact during friction welding is at the peripheral areas of the contacting surfaces. In one form, such shaped surface is in the form of a depression concave into the first component. The walls of the depression are disposed at an angle in the range of about 1° – 10° in respect to a plane normal to the friction welding axis of rotation.

4 Claims, 2 Drawing Figures

PATENTED OCT 2 1973 3,762,030

INVENTOR.
RONALD G. RAJALA
BY Lee J. Sachs
ATTORNEY

METHOD FOR MAKING A FRICTION WELDED ARTICLE

BACKGROUND OF THE INVENTION

The invention herein described was made in the course of or under a contract, or a subcontract thereunder, with the United States Department of the Air Force.

Friction welding, various forms of the method and apparatus for which have been widely discussed in the literature, is a solid state process for joining two components which are moved either relatively rotational or reciprocally with respect to one another. When such moving components are pressed one against the other with sufficient force, heat generated by friction between the components produces the friction welded joint.

Generally the relatively moving surfaces of the components at which the friction welded joint is to be produced are matched in shape one with the other. In the more simple forms, such surfaces are planar and parallel.

If the hot strength characteristics of both components are substantially the same and the areas of the surfaces to be joined are substantially equal, upsetting of each component will be substantially the same and friction welding can occur without significant problems. However, if under such size conditions the hot strength characteristics of one of the two components are greater than the other, preferential upsetting will occur in the weaker component. This sometimes occurs prior to the generation of sufficient frictional heat to provide a friction welded bond between the two components. One reported method for overcoming such preferential upset is to provide the lower hot strength component with a greater interface area than the stronger component in a flat, butt-weld configuration. Another reported approach to a solution to this problem involves shaping of the interface surface of the component with the higher hot strength so that it forms an apex, truncated cone, rounded or other convex interface when opposed to the flat interface surface of the lower hot strength component. However, it has been found that these configurations generate less frictional heat, and when generated, it initiates and builds at the central contact area. This tends to favor upset of the lower hot strength material.

SUMMARY OF THE INVENTION

It is a principal object of the present invention to provide an improved method for friction welding components one of which has not strength properties greater than the other.

Another object is to provide such a method by improved shaping of the interface surface of the component having greater hot strength properties.

These and other objects and advantages will be more clearly understood from the following detailed description and the drawing, all of which are meant to be representative of rather than limiting on the scope of the present invention.

The present invention provides a method for friction welding first and second metal components each of which has an interface surface to be opposed one to the other during friction welding. The first of such components has hot strength properties greater than the second. In general, the method includes shaping the interface surface of the first component so that initial contact between the first and second interface surfaces will be at such surface's peripheral area. In one specific form, the first surface is shaped in the form of a depression, concave into such component. The walls of the depression are disposed in general at an angle in the range of about 1° – 10° in respect to a plane normal to the friction welding axis of rotation. The interface surfaces of the first and second components are positioned in spaced apart, opposed relationship and then friction welding of such components is conducted at their interface surfaces.

DESCRIPTION OF THE PREFERRED EMBODIMENTS

Figure 1:
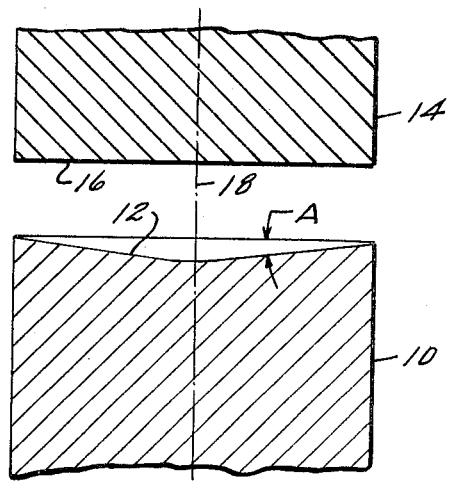
FIG. 1 is a fragmentary, sectional illustration of a pair of solid metal components with their interface surfaces in spaced apart, opposed relationship prior to friction welding according to the present invention.
Figure 2:
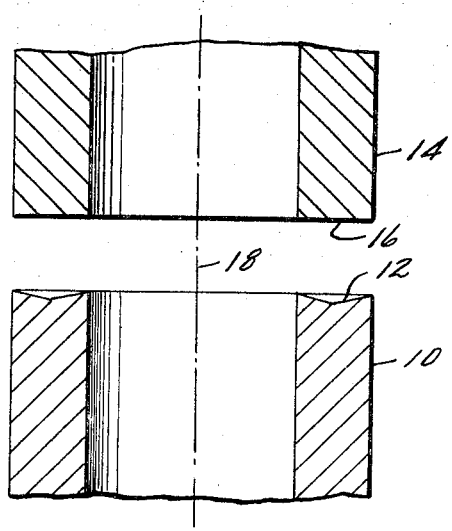
FIG. 2 is a fragmentary, sectional view of a pair of tubular metal components in the same relationship as in FIG. 1.

Illustrated in FIGS. 1 and 2 are relatively simple arrangements of two metallic components, substantially of the same dimensions, positioned prior to friction welding. First component 10 having an interface surface 12 has hot strength properties greater than second component 14 which includes interface surface 16. In simple form, these can be a pair of round bars or a pair of tubular members to be joined by friction welding at their respective interface surfaces 12 and 16.

For practice of one form of the method of the present invention, interface surface 12 of first component 10 is shaped in the form of a depression, concave into the first component. The walls of the depression are disposed preferably at an angle A in the range of about 1° – 10° in respect to a plane normal to the friction welding axis of rotation represented by centerline 18. During friction welding, one or both of the first and second components 10 and 14 are rotated about friction welding axis 18 to provide different relative movement between the components at their respective interfaces 12 and 16. During friction welding, the interface surfaces of the first and second components are pressed one on the other with a force sufficient to generate frictional heat adequate to weld the metal components at their interface surfaces.

It has been recognized that shaping the interface portion of the higher hot strength component in a manner, for example convex, such that its contact with an opposed surface of the lower hot strength component is generally at their peripheral areas, rather than their central areas, results in generally balanced or equal upset of both components during friction welding. At the central areas, relative rotational speed between the two opposed surfaces is much lower than at the peripheral areas. Hence lower frictional heat is generated. This results in more difficult friction welding which, when it occurs, favors upset of the lower hot strength material. The method of the present invention comprises shaping the interface portion of the higher hot strength material so that, when pressed into contact with an opposed surface during friction welding, initial contact occurs at the peripheral areas of the contacting surfaces.

During evaluation of the method of the present invention, a variety of specimens were tested. The following table includes some of such data.

TABLE I.—FRICTION WELDING DATA

| Example | Specimen diam. (in.) Cast | Specimen diam. (in.) Wrought | Cast alloy¹ interface geometry | Total upset energy, k. lb. ft./in.² | Weld pressure, k.s.i. | Upset Cast | Upset Wrought | Upset Total |
|---|---|---|---|---|---|---|---|---|
| 1 | .48 | .50 | Butt | 235 | 58 | .004 | .092 | .096 |
| 2 | .50 | .50 | Truncated cone | 220 | 58 | .050 | .099 | .149 |
| 3 | .50 | .50 | Concave 5° | 220 | 58 | .085 | .109 | .194 |
| 4 | .50 | .50 | Convex 5° | 220 | 58 | .016 | .078 | .094 |
| 5 | 1.68 | 1.85 | Convex 3° | 215 | 87 | .140 | .193 | .333 |
| 6 | 1.68 | 1.85 | Truncated cone | 215 | 87 | .100 | .173 | .273 |
| 7 | 1.71 | 1.85 | Concave 2° | 215 | 87 | .180 | .221 | .401 |
| 8 | .45 | .50 | Concave 5° | 220 | 53 | | | .169 |
| 9 | .45 | .50 | Concave 7.5° | 230 | 53 | | | .199 |
| 10 | .45 | .50 | Concave 2.5° | 230 | 53 | | | .204 |
| 11 | .45 | .50 | Concave 1.5° | 230 | 53 | | | .205 |

¹ Higher hot strength.

As used in the tables herein, "klb. ft." means "thousands of foot pounds" and "ksi" means "thousands of pounds per squrae inch," "El" means "elongation" and "R.A." means "reduction in area." The wrought alloy was a nickel base superalloy sometimes referred to as Rene' 95 alloy. The cast alloy in Table I and identified in Table II as Cast B was a nickel base superalloy sometimes referred to as Rene' 120. The following Table II gives high temperature tensile properties of these alloys along with another cast nickel base superalloy, identified as Cast A and sometimes referred to as Rene' 80 alloy.

TABLE II

Tensile Data

| Alloy | Temp. (°F) | Ultimate (ksi) | 0.2% Yield (ksi) | El (%) | R.A. (%) |
|---|---|---|---|---|---|
| Wrought | 1800 | 35 | 26 | 31 | 49 |
| Cast A | 1800 | 58 | 40 | 14 | 24 |
| Cast B | 1800 | 72 | 50 | 3 | 5 |
| Wrought | 2000 | 14 | 8 | 59 | 96 |
| Cast A | 2000 | 25 | | 12 | 13 |
| Cast B | 2000 | 37 | 30 | 2 | 1 |

The significant difference in hot strength characteristics is to be noted between the wrought alloy and cast alloy B. Not as significant a different in hot strength exists between the wrought alloy and cast alloy A. Accordingly, it was found that the practice of the method of the present invention was not necessary in their friction welding in the configurations tested.

The data of the above Table I show the significantly improved balance in upset and total upset characteristics which result from practice of the present invention when significant differences in hot strength exists. Comparison of the approximately ½ inch diameter specimens of examples 1 through 4 show a relatively balanced upset between the cast and wrought materials, and an improved total upset for example 3 within the scope of the present invention. Note the high degree of unbalance and lower total upset in examples 1, 2 and 4. Similarly, in the approximately 1 ¾ diameter specimens of examples 5 through 7, the same significant improvement is shown for example 7 according to the present invention. Examples 8 through 11 represent other tests, on cast alloy interface geometry, according to practice of this invention, disposed at angles in the range of about 1° – 10° in respect to a plane normal to the friction welding axis of rotation.

Thus, a slight amount of relief in the central contact area of the significantly higher hot strength material is sufficient to concentrate frictional heat at the periphery of the contacting surfaces during friction welding. This results in significantly improved friction welding operation.

As a result of these evaluations, it was recognized that with the interface depression at an angle of less than about 1°, too little relief is afforded to direct the area of heat generation toward the peripheral area. In addition, with such angle greater than about 10°, the total amount of upset required to friction weld would be excessive. For example, for a 1 ¾ inch diameter specimem, it was found that there is a 0.017 inch drop for each degree of angle. Thus, for greater than a 10° angle, it would be necessary to upset the higher hot strength material more than 0.17 inch in order to friction weld to the lowest point in the depression. Because of the substantially balanced upset which results from practice of the present invention, total upset would have to be greater than about 0.35 inch, which is excessive for practical applications.

Although the present invention has been described in connection with specific examples and embodiments, it will be understood by those skilled in the art of metallurgy and friction welding the modifications and variations of which the present invention is capable.

What is claimed is:

1. In a method for friction welding first and second metal components, each having an interface surface to be opposed one to the other during friction welding, the first component having hot strength properties greater than the second component, the steps of:
   shaping the interface surface of the first component in the form of a depression concave into the first component, the walls of the depression being disposed at an angle in the range of between 1° – 10° in respect to a plane normal to the friction welding axis of rotation and in respect to the interface surface of the second component so that the initial contact between the first and second interface surfaces will be at the peripheral areas of such surfaces;
   positioning the interface surfaces of the first and second components in spaced-apart, opposed relationship; and then
   friction welding the first and second metal components at their interface surfaces.

2. The method as in claim 1 in which the first and second components are tubular in shape.

3. The method as in claim 1 in which each component is a nickel base superalloy.

4. The method of claim 3 in which The first component is a cast superalloy structure and the second component is a wrought superalloy structure.

* * * * *